United States Patent Office 3,429,252
Patented Feb. 25, 1969

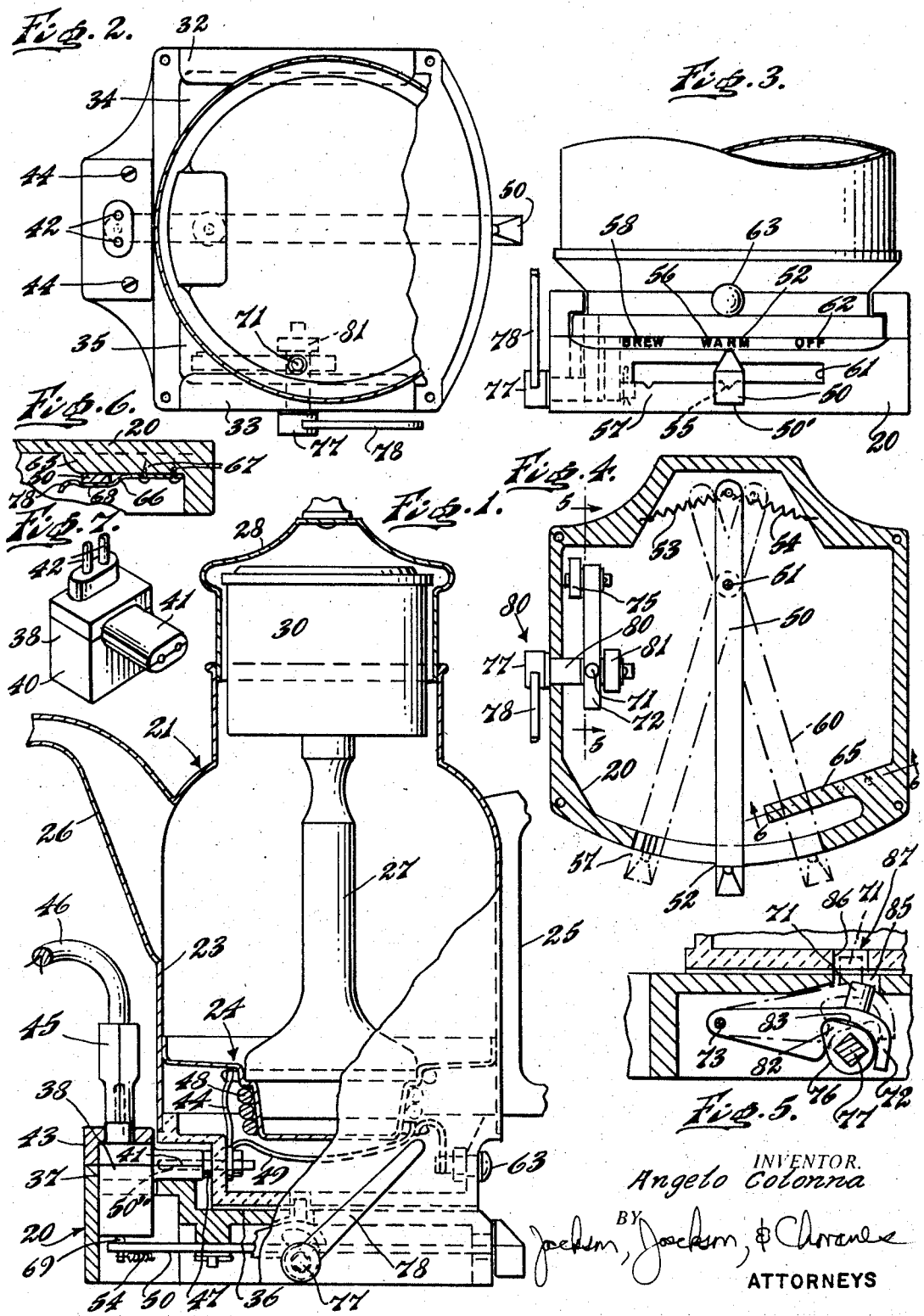

---

3,429,252
COFFEE MAKER AND BREWER
Angelo Colonna, 2114 Bowler St.,
Philadelphia, Pa. 19115
Continuation-in-part of application Ser. No. 635,560,
May 2, 1967. This application July 1, 1968, Ser.
No. 741,767
U.S. Cl. 99—281                              4 Claims
Int. Cl. A47j *31/00;* F27d *11/00*

ABSTRACT OF THE DISCLOSURE

The present invention involves a coffee brewer and container which is used initially to brew the coffee and then subsequently to warm the coffee, as well as serve the coffee. The coffee brewer and server comprises a base, and a brewer and server assembly which fits into the base. The brewer and server assembly is selectively locked in the base. A selector lever controls the cycle position.

Cross reference to related application

This is a continuation-in-part of my copending application Ser. No. 635,560, filed May 2, 1967, now Patent No. 3,391,631, for Coffee Maker and Brewer.

Background of the invention

*Field of the invention.*—The device pertains to a combination coffee brewer and server and more particularly with a brewer of relatively small quantities of coffee, for instance, of a capacity from 2 to 15 cups. The coffee maker is desirably of an infusion or percolator type wherein the water is heated in a container at a lower lever and then travels upwardly through a tube to spray above the coffee grounds supply after which the coffee drips back into the container. The device of the invention is particularly adapted for use in vehicles, on land, sea and air, but additionally the device can be used in stationary commercial establishments such as hotels, restaurants, and other institutions, as well as homes.

*Description of the prior art.*—Numerous prior art percolators to brew coffee are now in use. There are, however, many disadvantages to these existing percolators.

In the prior art electrical percolators, an electrical source is connected to the percolator heating coil, usually through a conventional extension cord. The cord plug itself is plugged into the household receptacle. In brewing a pot of coffee, the pot is filled with cold water and coffee grounds are inserted in the container within the pot. Upon initial electrical connection to the household current by connecting the plugs into the receptacles, the heating coil within the percolator is fully energized so that maximum heating is imparted to the percolator so that the brewing or percolator cycle begins. After a time, determined automatically, electrical energy to the coil is reduced, so that the coil is only heating at a partial capacity. This partial heating is usually designated as the "warm" part of the cycle, and the purpose is to retain the coffee in a warm condition while waiting to be served.

In the event that the electrical supply is interrupted to the heating coil of the percolator and then the electrical supply is reconnected, the percolator mechanism starts again a complete percolating cycle to rebrew the remaining liquid coffee, before returning to the warm portion of the cycle.

This second, or subsequent rebrewing is undesirable, but is inherent in the prior art electrical percolators, since the intended operation is that once the electrical supply is connected to the percolator, it remains connected until the entire supply of the coffee within the pot is utilized. However, as a practical matter, in normal use, the user often disconnects the electrical cord from the pot, while he is serving coffee, in order to carry the pot to the position beyond the electrical connection.

Additionally, in the prior art of percolators and coffee makers and brewers, it was necessary to either keep the entire percolator or brewer secured to the electrical cord and serve the coffee in the area defined by the electrical cord connection, or it was necessary to disconnect the cord from the percolator to carry the pot to a distant location. In my copending application, I set forth means for readily disconnecting, both electrically and structurally, a coffee brewer and server assembly from a base unit, so that the brewer and server assembly may be freely transported about.

Summary of the present invention

The present invention along with the invention in my copending application, overcomes the disadvantages set forth above in the prior art. One one hand, in the present invention, once the coffee has been brewed, any subsequent disconnection and connection of the electrical supply to the brewer does not change or rebrewing of the coffee. More specifically, the brewing and warming cycles will be so controlled that the heating coil will not go into a brewing cycle after an initial brew so that there is no undesirable rebrewing of the coffee. This is accomplished by a selector lever in the base of the coffee maker and brewer, which is automatically biased to a warm position for all subsequent heating of the coffee after the initial brew. In other words, the lever will remain at the warm position once the initial brew is completed. The lever initially is manually placed in the brew position at the beginning of the operation. This allows the coffee brewer and server to be continuously, if desired, removed and reinserted into the base without causing additional brewing.

The present invention is also concerned with locking means for locking the brewer and server of the device set forth in my copending application, into the base. This is particularly desirable for utilizations of the coffee maker and brewer in bouncing or unstable applications such as airplanes, trains, ships, and the like. When the locking device is applied, the brewer and server is securely held in position at all times, unless the locking lever is manually released and placed in the neutral position.

Description of the drawings

FIGURE 1 is a partial section of the coffee brewer and server of the invention with the brewer and base partially broken away.

FIGURE 2 is a top plan section of the device of FIGURE 1.

FIGURE 3 is a front elevation, partly broken away, showing the cycle selector lever.

FIGURE 4 is a top plan section of the base showing the selector lever and the locking lever.

FIGURE 5 is a partial vertical section on the line 5—5 of the base and the brewer and server assembly showing the follower and locking abutment.

FIGURE 6 is a section on line 6—6 of FIGURE 4.

FIGURE 7 is a perspective view of the prong and plug assembly of the invention.

Description of the present embodiment

The coffee maker and brewer involved in the present invention is disclosed in detail in my copending application referred to above.

The device of the invention comprises a base 20 and a brewing and serving assembly 21 intended to be held and secured in the base 20. For a full and complete description of the details of the base and serving assembly, reference is made to my copending application set forth above.

The brewer and server assembly 21 has a container portion 23, an electrical heating compartment 24, a handle 25, a spout 26, a percolator assembly 27, and a lid 28. Again, details of the container, the electrical heating compartment, and the percolator assembly are set forth in my copending application and reference is made thereto. The assembly 21 utilizes an infusion can 30 containing coffee grounds as the source of the coffee for coffee making, which is inserted in position as shown during the brewing cycle. The bottom of the can as well as the top has selected openings to provide proper movement of the water through the grounds. The brewer and server assembly 21 fits into the base 20 of a guide arrangement 31 which includes tracks 32 and 33 that engage runners 34 and 35 on the brewer and server assembly 21. The base 20 also includes a bottom support 36 which supports the bottom of the brewer and server assembly 21. The base also has included therein an opening or cavity 37 which receives plug 38 as best seen in FIGURES 1 and 7. Plug 38 includes a base portion 40, a female portion 41, and a male portion 42. The female and male portions are suitably disposed at right angles to one another as best seen in the mentioned figures. The plug 38 is held within the base by a cap or clamp member 43 which fits over plug 38, and which is secured to the base by screws 44 to clamp plug 38 into the base in a saddle-like arrangement.

The plug 38 suitably receives an extension cord plug 45 on extension cord 46 which has at the end remote from plug 45 a common two-pronged plug intended to be inserted into a household outlet or receptacle. Female portion 41 of plug 38 receives prongs 47 from the assembly 21, the prongs 47 being guided into position into portion 41 under the influence of tracks 32 and 33 on runners 34 and 35 on the brewing and serving assembly 21.

The general structure described up to this point follows that generally of my copending application. However, plug 38 in this application is of a special construction, as described. In the present plug structure 38, the base portion 40 has suitable switching contacts in three positions, which correspond to (1) a maximum flow to a heating resistor 48 through conductors 49, which constitutes the "brew" portion of the cycle, (2) an intermediate switch which activates a portion of the resistor coil 48 to create a "warm" portion of the cycle, and (3) an off-switch, wherein all current through cord 46 into conductors 49 is terminated through plug 38. Hence, plug 38, in addition to having plug and receptacle portions also has a switching portion which allows selectively full current to the resistor coil 48, partial current to the resistor coil 48 or no current to the resistor coil 48. The switching arrangements of plug 38 are activated by a lever 50 as best seen in FIGURES 1, 3 and 4. Selector lever 50 is pivoted at 51 off base 20 is biased into a central warm position 52 by opposing helically wound tension springs 53 and 54. The selector lever 50 seats in a notch at 55 in the base 20 so that the lever is relatively fixed unless manually moved from this position. The position is marked appropriately with the word "warm" at 56. The selector lever also has a "brew" position at 57 with a notch in the base at the brew position to selectively seat the lever when maneuvered into this position. The word "brew" appears at position 58.

Additionally the selector lever 50 has an off position at location 61 as seen in FIGURE 3. The "off" position is also appropriately marked at 62. A pilot light 63 is wired into the circuit to indicate when the selector lever is either in the brew or warm position. The lever 50 is held in the off position by a clip arrangement as best seen in FIGURES 4 and 6. A boss portion 65 in the base has located thereon a spring clip 66 held by screws 67. The clip has an indent portion 68 which receives lever 50 when manually forced over the curvature 70 in the clip 66. The lever 50 is held in the off position against the bias of springs 53 and 54 which tend to keep the lever in the warm position, until the lever is manually forced over lip 70 whereby clip 66 is sprung open.

Lever 50 when placed in the brew position is held therein by a suitable retaining abutment 69 which extends from plug 38 during the brewing portion of the cycle. Abutment 69 extends in interferring relationship to the path of lever, preventing the biasing springs 53 and 54 from returning the lever into a warm position at 52. At the end of the brewing cycle, abutment 69 is automatically withdrawn into portion 40 of plug 38 out of interference with lever 50 whereby springs 53 and 54 return lever 50 into its normal "warm" position.

In operation, the brewing and serving assembly is properly filled with both water and coffee as described for instance in my copending application. The brewing and serving assembly is then slid on runners 34 and 35 into base 20 along tracks 32 and 33. The assembly 21, with electrical prongs thereon, is guided along the base until prong 47 engages female portion 41 of plug 38. Extension plug 45 on extension cord 46 is engaged with the male portion 42 of plug 38. Electrical contact is now made into the heating resistance coil 48 of heating portion 24 of the assembly 21. Selector lever 50 which is normally in the off position when no coffee is being brewed or warmed, is moved manually by means of knob 50' from the off position over into the brew position at notch 57. As the lever is moved into the brew position, the end of the lever beneath male portion 40 of plug 38 engages the abutment 69 on the plug in racket fashion to prevent the return of lever 50 under the influence of springs 53 and 54 into the warm position. The brewing cycle begins. At the end of the brewing cycle, abutment 72 is automatically withdrawn within portion 40 of plug 38 and selector lever 50 automatically turns to the normal warm position under the influence of springs 53 and 54. The lever 50 contacts the switch in plug 38 switching the current to 48 from a full or high position, to a warm heating position.

The assembly 21 is now free to be continuously and repetitively removed and reinserted into the base without incurring a rebrewing but continuously receiving a heat sufficient to keep the coffee at a warm position to heating coil 24. When it is no longer desired to keep the contents at a warm position or when the contents are fully used, the selector lever 50 is moved manually into the off position where it is held by spring clip 66.

The assembly is locked to the base 20 when desired by a locking arrangement as best seen in FIGURES 4 and 5.

The locking arrangement comprises an abutment 71 which is fixed on a cam follower 72 pivoted to the base at 73. Pivot 73 is fixed to the base 20 at boss 75 which is suitably integral with the base. The follower 72 is normally biased in a clockwise direction as shown in FIGURE 5 under the influence of gravity, and also under the influence of cam 76. Cam 76 is keyed on rotating shaft 77 which has fixed thereon lever 78. Shaft 76 is rotatably journaled in the base at 80 at one point, and journaled in boss 81 at its other end. Cam 76 has an extended portion 82 which rides in groove 83 of follower 72. By appropriate rotation of lever 78, cam 76 drives follower 72 counterclockwise as viewed in FIGURE 5. Selective rotation of the lever 78, and hence selective rotation of follower 72 raises or lowers locking abutment 71 through the fixed base opening 85 into opening 86 in the bottom of the brewer and server assembly 21 at 87. By positioning abutment 71 in an upward position, the brewer and server assembly 21 is prevented from being slid forward on the base, because of the interference from abutment 71. When it is desired to remove the brewer and server 21 from the base, the handle 78 is suitably rotated to lower abutment 71 out of interfering relationship with the brewer and server bottom at 87, thus allowing the brewer and serving assembly 21 to be withdrawn from the base.

In view of my invention and disclosures, variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described by invention, what I claim as new and desire to secure by Letters Patent is:

1. A coffee brewer and server comprising in combination; a base including tracks and a plug receptacle positioned with respect to the tracks; a brewer and server assembly slidably engaging the base, and selectively removable from the base, said assembly having runners thereon adapted to slidably engage the tracks on the base whereby the assembly is securely held and accurately positioned on the base, and having an electrical compartment including prongs extending therefrom positioned with respect to the runners; said receptacle and prongs being positioned with respect to said tracks and runners respectively whereby said prongs engage said receptacle when the runners slidably engage the tracks; and locking means for selectively locking the brewer and server assembly to the base.

2. A coffee brewer and server of claim 1, wherein the locking means comprise a cam, a cam follower, an abutment on the follower, a lever on the cam, and means for selectively positioning the abutment into interfering relationship between the base and the brewer and server assembly.

3. A coffee brewer and server comprising in combination; a base including tracks and a plug receptacle positioned with respect to the tracks; a brewer and server assembly slidably engaging the base, and selectively removable from the base, said assembly having runners thereon adapted to slidably engage the tracks on the base whereby the assembly is securely held and accurately positioned on the base, and having an electrical compartment including prongs extending therefrom positioned with respect to the runners; said receptacle and prongs being positioned with respect to said tracks and runners respectively whereby said prongs engage said receptacle when the runners slidably engage the tracks; and selector control means for preventing a rebrewing of the coffee, subsequent to the initial brew, when the brewer and server assembly is removed and reinserted into the base.

4. A coffee brewer and server of claim 3, wherein the selector control means comprises; switch means on the plug receptacle having a brewing position, a warming position, and an off position; lever means on the base for manually selecting the switch positions on the receptacle; biasing means on the lever means for returning the lever means to a warm position from a brewer position; release means on the receptacle for permitting the lever means to return to a warm position, after a brew cycle; and retaining means on the base for securing the lever means in a warm position subsequent to a single and initial brew cycle.

References Cited

UNITED STATES PATENTS

| | | | |
|---|---|---|---|
| 964,518 | 7/1910 | Holley | 99—311 |
| 2,145,107 | 1/1939 | Benander | 219—432 |
| 2,817,743 | 12/1957 | Foster | 99—310 X |
| 3,095,801 | 7/1963 | Fogg | 99—312 |

ROBERT W. JENKINS, *Primary Examiner.*

U.S. Cl. X.R.

219—432